(12) United States Patent
Ferreiro (10) Patent No.: US 9,889,598 B2
(45) Date of Patent: Feb. 13, 2018

(54) ADHESIVE THREAD SYSTEM

(71) Applicant: Roxanne Ferreiro, Weston, MA (US)

(72) Inventor: Roxanne Ferreiro, Weston, MA (US)

( * ) Notice: Subject to any disclaimer, the term of this patent is extended or adjusted under 35 U.S.C. 154(b) by 101 days.

(21) Appl. No.: 14/999,320

(22) Filed: Apr. 25, 2016

(65) Prior Publication Data

US 2016/0243755 A1 Aug. 25, 2016

Related U.S. Application Data

(62) Division of application No. 13/594,415, filed on Aug. 24, 2012, now abandoned.

(60) Provisional application No. 61/575,602, filed on Aug. 24, 2011.

(51) Int. Cl.

| | | |
|---|---|---|
| *B29C 65/48* | (2006.01) | |
| *B29C 65/00* | (2006.01) | |
| *D05B 1/26* | (2006.01) | |
| *A41D 27/24* | (2006.01) | |
| *A41H 43/04* | (2006.01) | |
| *B29C 65/18* | (2006.01) | |
| *B29C 65/50* | (2006.01) | |
| *B29C 65/62* | (2006.01) | |
| *B29C 65/74* | (2006.01) | |
| *D06H 5/00* | (2006.01) | |

(Continued)

(52) U.S. Cl.
CPC ............ *B29C 65/48* (2013.01); *A41D 27/245* (2013.01); *A41H 43/04* (2013.01); *B29C 65/18* (2013.01); *B29C 65/4815* (2013.01); *B29C 65/5035* (2013.01); *B29C 65/5057* (2013.01); *B29C 65/62* (2013.01); *B29C 65/7437* (2013.01); *B29C 66/1122* (2013.01); *B29C 66/21* (2013.01); *B29C 66/30325* (2013.01); *B29C 66/43* (2013.01); *B29C 66/729* (2013.01); *B29C 66/8242* (2013.01); *B29C 66/836* (2013.01); *B29C 66/8362* (2013.01); *B29C 66/845* (2013.01); *D05B 1/26* (2013.01); *D05B 17/00* (2013.01); *D06H 5/00* (2013.01); *B29C 65/5092* (2013.01); *B29L 2031/726* (2013.01); *Y10T 156/1304* (2015.01)

(58) Field of Classification Search
CPC . B29C 65/48; B29C 65/5035; B29C 65/7437; B29C 66/1122; D05B 1/26; D05B 17/00; D05H 5/00
See application file for complete search history.

(56) References Cited

U.S. PATENT DOCUMENTS

| | | |
|---|---|---|
| 1,560,712 A | 11/1925 | Naylor |
| 2,115,368 A | 4/1938 | Lustberg |
| 2,465,374 A | 3/1949 | Haman et al. |

(Continued)

*Primary Examiner* — Mark A Osele
*Assistant Examiner* — Christopher C Caillouet
(74) *Attorney, Agent, or Firm* — Michael de Angeli (57) ABSTRACT

A system for forming a waterproof seam between to sewn materials. The seam is formed using an adhesive coated thread. A thin strip of adhesive is placed between the two materials at the seam line. As the coated thread is sewn into the seam heat and pressure are simultaneously applied, melting the adhesive coating thereby filling the needle punctures. The melted adhesive coating will also flow into the areas between the needle punctures and between the materials. The heat and pressure applied to the coated thread will also melt the adhesive strip, causing additional adhesive to flow into the needle punctures and the areas between needle punctures.

9 Claims, 12 Drawing Sheets

(51) Int. Cl.
*D05B 17/00* (2006.01)
*B29L 31/00* (2006.01)

(56) References Cited

U.S. PATENT DOCUMENTS

| | | |
|---|---|---|
| 2,702,067 A | 2/1955 | Goldberg |
| 3,272,682 A | 9/1966 | Balamuth |
| 3,457,739 A | 7/1969 | Frand |
| 4,604,152 A | 8/1986 | Liukko |
| 4,605,578 A | 8/1986 | Emrich et al. |
| 5,003,902 A | 4/1991 | Benstock et al. |
| 5,159,719 A | 11/1992 | Aumann |
| 5,162,149 A | 11/1992 | Reaney |
| 5,670,577 A | 9/1997 | Dawson, Jr. |
| 5,869,182 A * | 2/1999 | Ebert ............... A41D 27/24 428/364 |
| 5,885,679 A | 3/1999 | Yasue et al. |
| 6,293,080 B1 * | 9/2001 | Nishihara ......... D02G 3/404 57/200 |
| 7,695,579 B2 | 4/2010 | Kramer et al. |
| 2004/0031571 A1 | 2/2004 | Lin |

* cited by examiner

ADHESIVE THREAD SYSTEM

CROSS-REFERENCE TO RELATED APPLICATIONS

Applicant claims the priority benefits of U.S. Provisional Patent Application No. 61/575,602, filed Aug. 24, 2011.

BACKGROUND OF THE INVENTION

This invention relates generally to the field of sewing, and, in particular, to a system for making a waterproof seam.

In sewing, a seam is the join where two or more layers of fabric or other material are held together with stitches. The nature of sewing a seam is have a needle puncture a series of holes in the materials to be joined and simultaneously inter-leavening thread through the holes thereby fastening the materials to each other.

Many seam applications require the seam to be water resistant, and even water proof. Examples of this are outdoor clothing, tents, and sleeping bags. The problem with conventional seams is that water can pass through the holes alongside the thread, and also between the joined materials. The prior art addresses this problem by applying an adhesive tape over the seam thereby sealing the seam. The seal tape is a strip of adhesive coated material applied over the seam with a separate seam-sealing machine. This is costly both in the requirement of a separate machine and also, more importantly, in the extra labor required to operate the separate machine.

SUMMARY OF THE INVENTION

The present invention addresses the problems inherent in prior art seam sealing by eliminating the need for seam tape thereby eliminating the need for a separate machine and the extra labor steps needed to apply the seam tape. The present invention accomplishes this by using a special thread coated with an adhesive. As the coated thread is inserted through the seam holes, heat and pressure are simultaneously applied thereby activating the thread costing. The activated thread coating melts into each cavity formed by a needle puncture. Applicant has found that the above process provides a highly water repellant seam. Pull water proofing of the seam is accomplished by providing an additional think adhesive strip between the materials to be joined along the seam line. The heat and pressure applied as the coated thread is inserted through the seam holes also melts the adhesive strip providing additional adhesive flow into the needle holes and between the seam holes of the materials to be joined.

This primary purpose of the present invention is to produce a highly water and wind repellent or waterproof and windproof seam. The present invention allows the waterproof/windproof process to be centralized and completed in one step, eliminating the prior art two-three step taping and saving process. The present invention eliminates the requirement of a seal tape thereby reducing the bulk of conventional seal taping and the weight of the overall end item. The present invention facilitates machine operation in areas such as curves. Floor space required for seam sealing machinery is eliminated. The need for a seam seal operator is also eliminated. The overall time and cost for seam sealing is substantially reduced by the present invention. The present invention is particularly adapted for clothing, shoes, tents, sleeping bags, outdoor furniture, boating supplies, umbrellas, back packs and covers.

These together with other objects of the invention, along with various features of novelty, which characterize the invention, are pointed out with particularity in the following disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
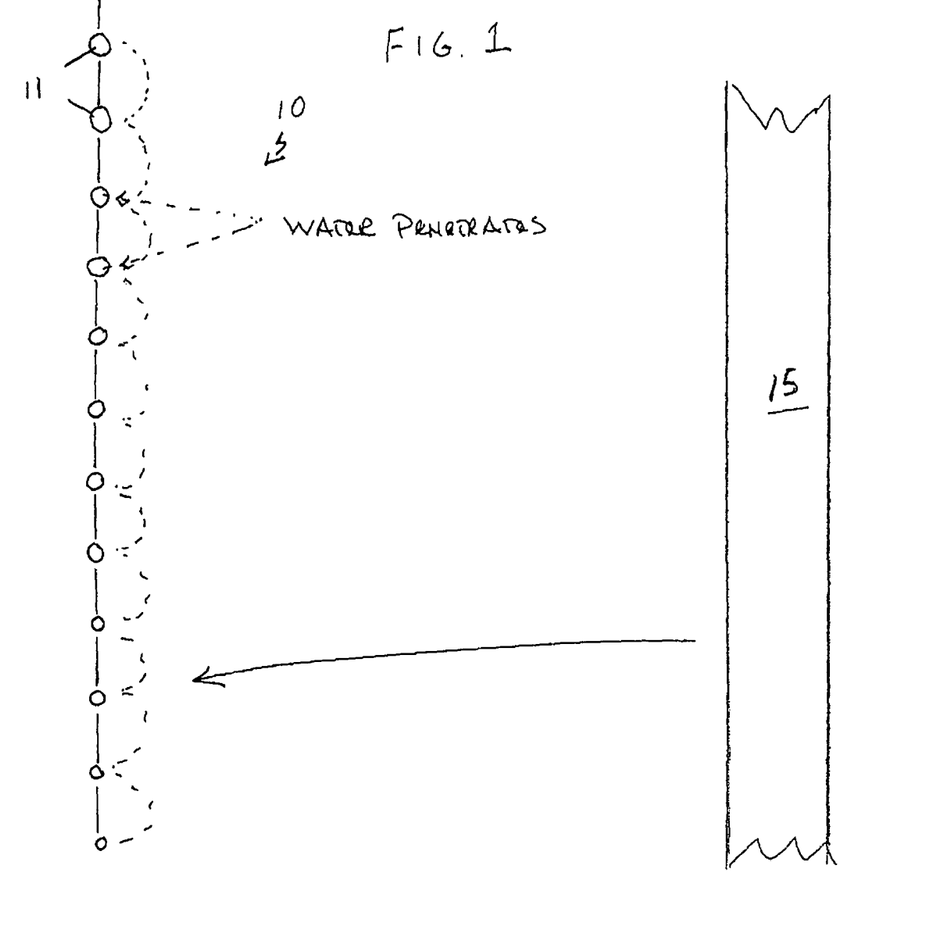
FIG. 1 is a diagram of a prior art system.
Figure 2:
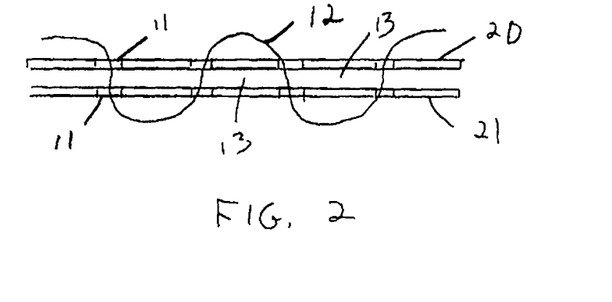
FIG. 2 is an exploded side view of a prior art seam.

Referring to the drawings in detail wherein like elements are indicated by like numerals, there is shown in FIGS. 1 and 2, an example of a prior art waterproof seam 10. The prior art seam 10 has a series of needle punctures 11 through which thread 12 is passed. In the example shown, two pieces of material 20, 21 are being joined along the seam 10. Water/moisture can pass through the punctures 11 along side the thread 12 and also between the joined material pieces 20, 21 in the areas 13 between puncture holes 11. A separate sealing tape 16 having an adhesive coating is placed over the seam 10 and adhered to the seam with heat and pressure. This second step provides a waterproof seam.

Figure 3:
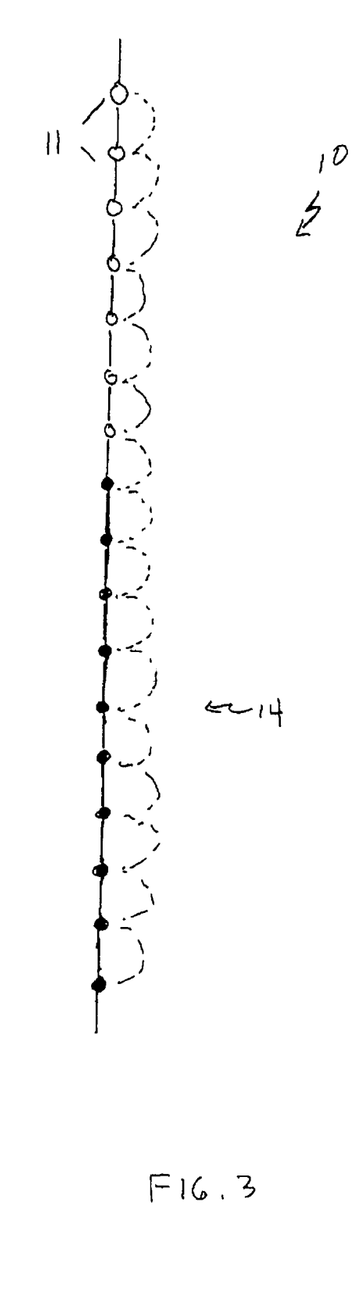
FIG. 3 is a diagram of the existing system.
Figure 4:
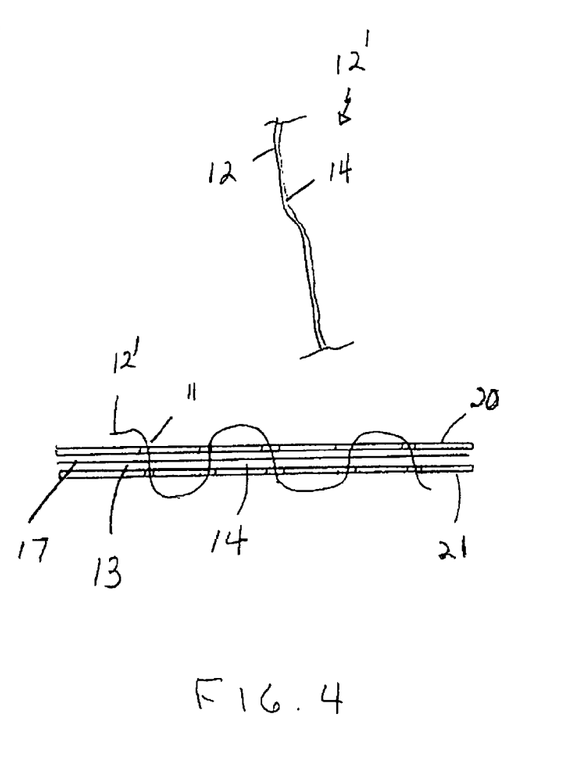
FIG. 4 is an exploded side view of an invention seam.

Referring to FIGS. 3 and 4, the present invention seam 10 is formed using an adhesive coated thread 12'. The coated thread 12' is comprised of a thread 12 with an adhesive coating 14. As the coated thread 12' is applied, heat and pressure are simultaneously applied, melting the adhesive coating 14 thereby filling the needle punctures 11. The melted adhesive coating 14 will also flow into the areas 13 between the needle punctures 11 and between the materials 20, 21. This results in a highly water repellant seam. To make the seam absolutely water proof, a thin strip of adhesive 17 may be placed between the two materials 20, 21 at the seam line 10. The heat and pressure applied to the coated thread 12' will also melt the adhesive strip 17, causing additional adhesive to flow into the needle punctures 11 and the seam 13 between needle punctures.

Figure 5:
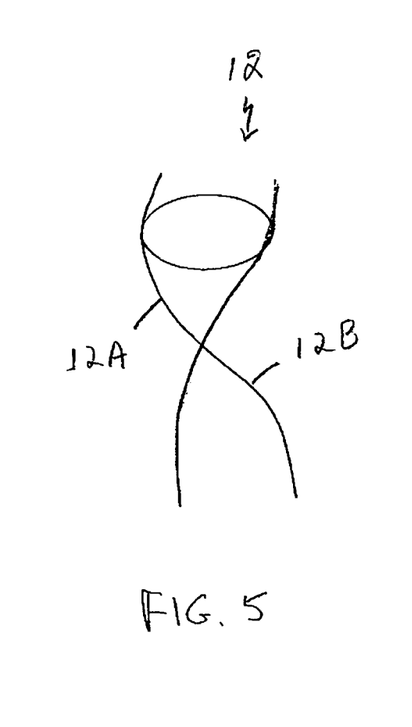
FIG. 5 is a diagrammic view of a prior art two thread twist.
Figure 6:
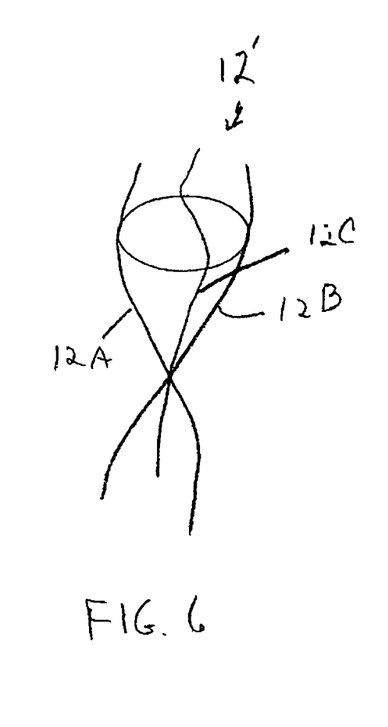
FIG. 6 is a diagrammic view of the invention three thread, Z-twist.
Figure 7:
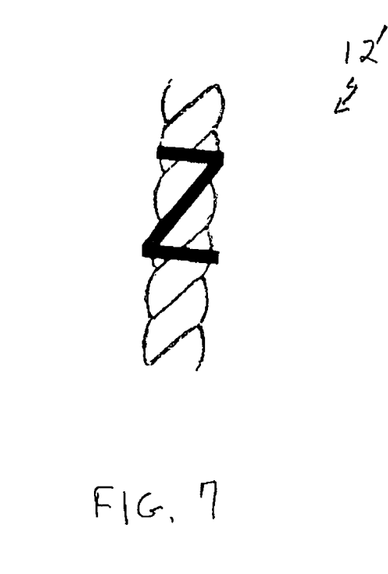
FIG. 7 is another view of the invention three thread.
Figure 8:
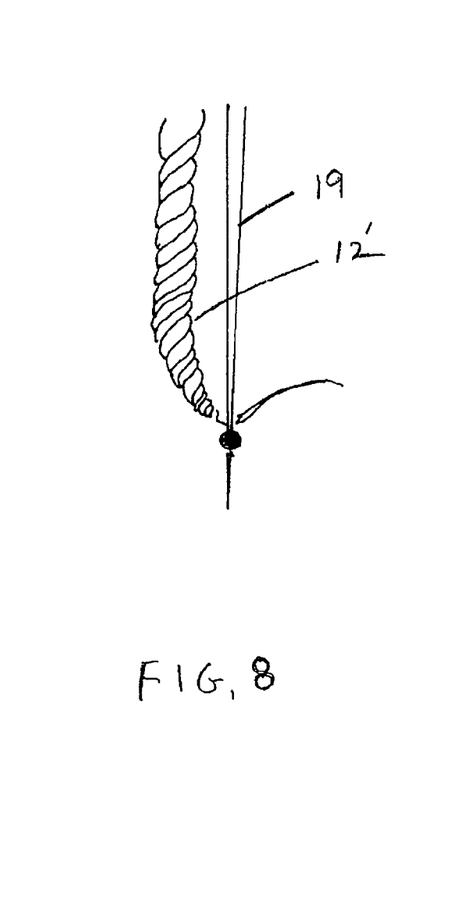
FIG. 8 is a diagrammic view of the thread being sewed with a needle.
Figure 9:
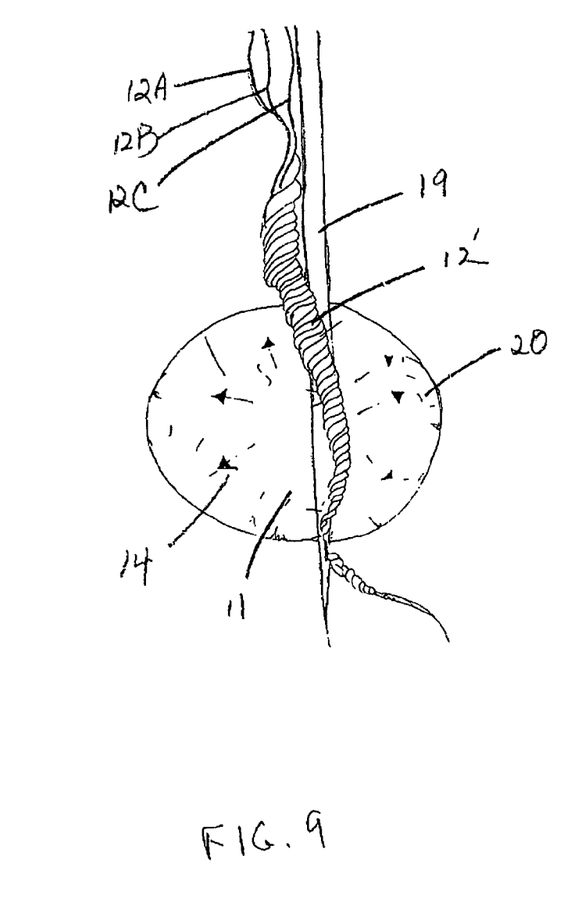
FIG. 9 is a magnified view of the invention thread being sewed into a fabric.

Nearly 99% of the apparel industry uses a two thread clockwise twist. See FIG. 5, wherein two threads, 12A, and 12B are twisted together. The invention thread 12', as shown in FIGS. 5 and 7, is formed with three threads, 12A, 12B and 12C, twisted counter clockwise in a Z-twist, and coated with an adhesive 14. Thus the thread 12' may nominally be 30/3 cotton count with three turns per inch minimum and having a left twist. This makes the thread puff up, further spreading the adhesive coating in each needle puncture hole. Referring to FIGS. 8 and 9, there is shown a needle 19 inserting the invention thread 12' through a magnified needle puncture 11. The fibers from the coated thread 12' expand and adhere to the needle hole 11. The adhesive 14 from the coated thread seals the hole 11. Additional adhesive 14 from the adhesive strip 17 will also contribute to filling the hole 11. In the preferred embodiment, the thread is made from cotton. Polyester and nylon thread may also be used.

The adhesive coating 14 is nominally 2% to 6% coating by thread weight. The adhesives used in this example were thermoplastic Polyurethane (TPU) adhesives. These adhesives bond to a wide range of substrates and very good properties. Other families of adhesives may also be uses such as nylon, polyester, polyolefin and vinyl.

An apparatus 30 designed to implement the above method is provided. The apparatus 30 is preferably an add-on to an existing conventional sewing machine 50. In the example shown, a single needle machine is shown. Double needle machines could as easily be used. The apparatus 30 must produce a sealed and sewn seam in one operation. The apparatus 30 must use the invention thread 12' and adhesive strip 17 in the sewing assembly operation while transferring heat to the sewn seam 10 to activate the components of adhesive strip and thread adhesive. Heat must be applied in synchronization with the normal operation of sewing a garment. The heat contact must be intermittent and synchronized with the sewing machine start and stops. Heat transfer must be adequate to activate adhesives and sewing seam speed. The apparatus roller speed must match machine speed through the sewing operation.

Figure 10:
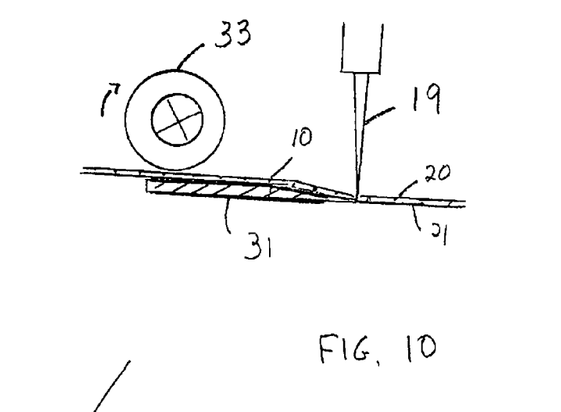
FIG. 10 is a side view of a seam, needle and top and bottom heating elements.
Figure 11A:
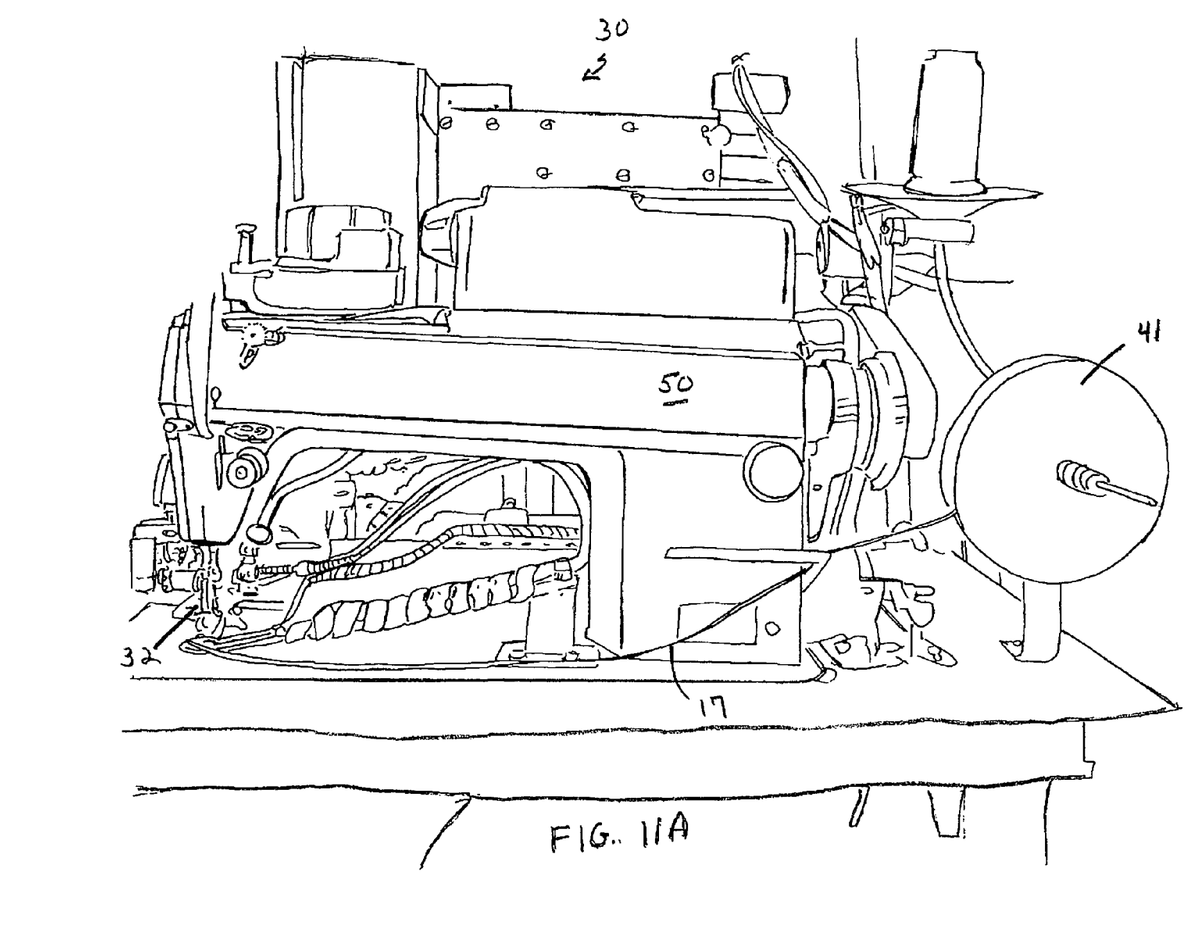
FIG. 11A is a front view of the invention apparatus.
Figure 12A:
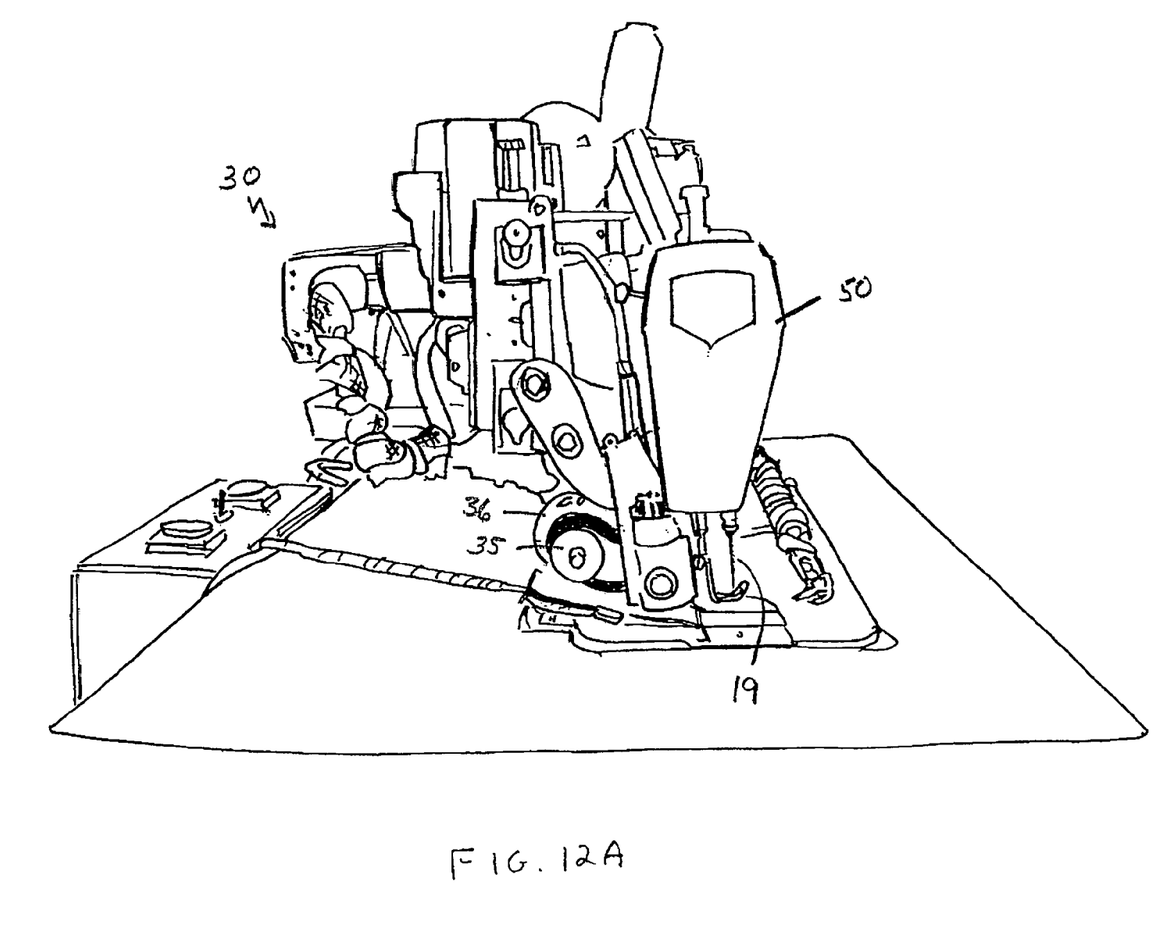
FIG. 12A is a left side view of the invention apparatus.
Figure 12B:
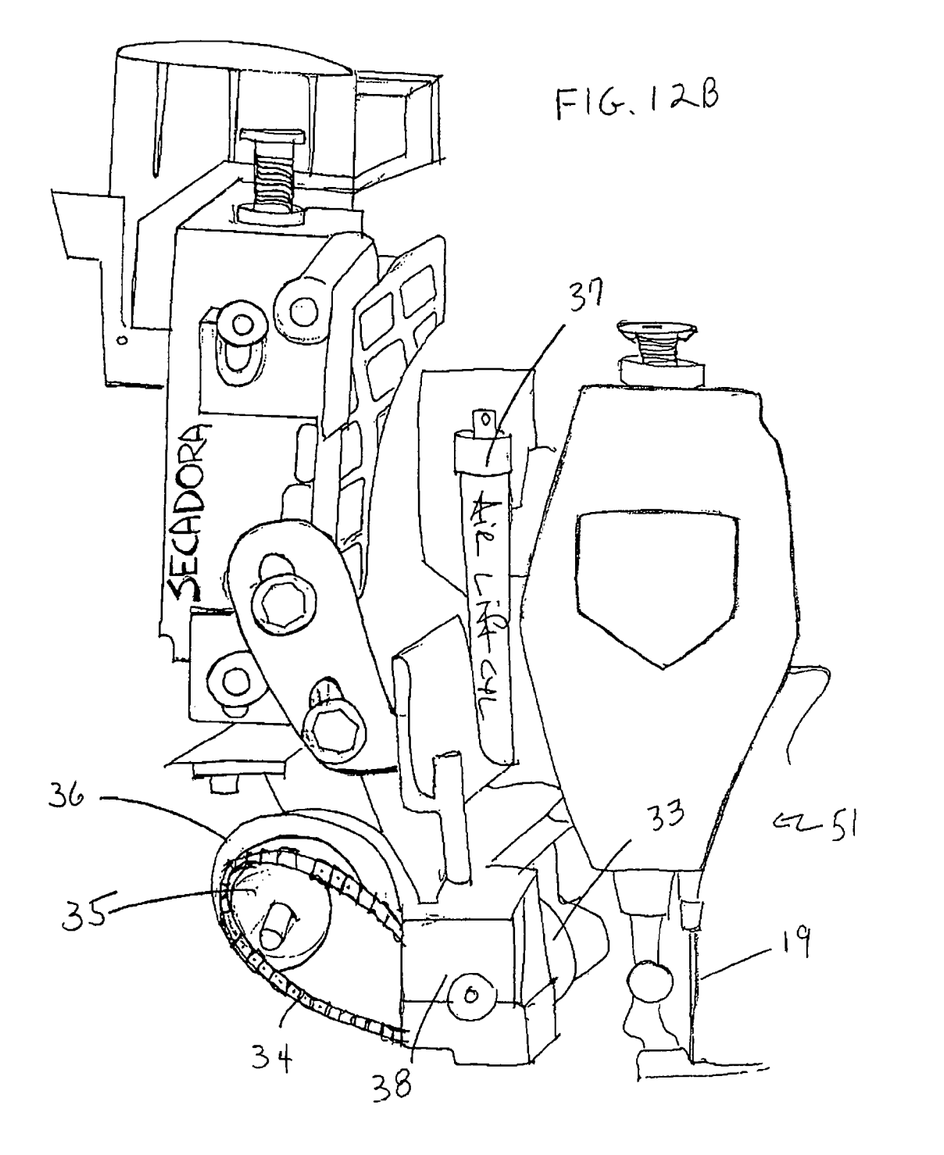
FIG. 12B is a partial right side view of the invention installed on a conventional sewing machine.

The present invention sewing machine 30 has a single sewing needle 19 operated by conventional means. As the two materials 20, 21 are brought together to form a seam 10, the seam 10 is passed through the sewing chamber 32 containing a sewing needle 19, between a plate 31 and a heater wheel 33. The plate 31 and heater wheel 33 are separately heated. The heat from the plate 31 and wheel 33 melt the adhesive 14 coating the invention thread 12'. The heat, combined with the downward pressure from the wheel 33, react the adhesive forcing the adhesive into needle puncture holes 11 and the area 13 between the two materials 20, 21 forming the seam 10. The heating plate 31 may be replaced with a roller.

Figure 11B:
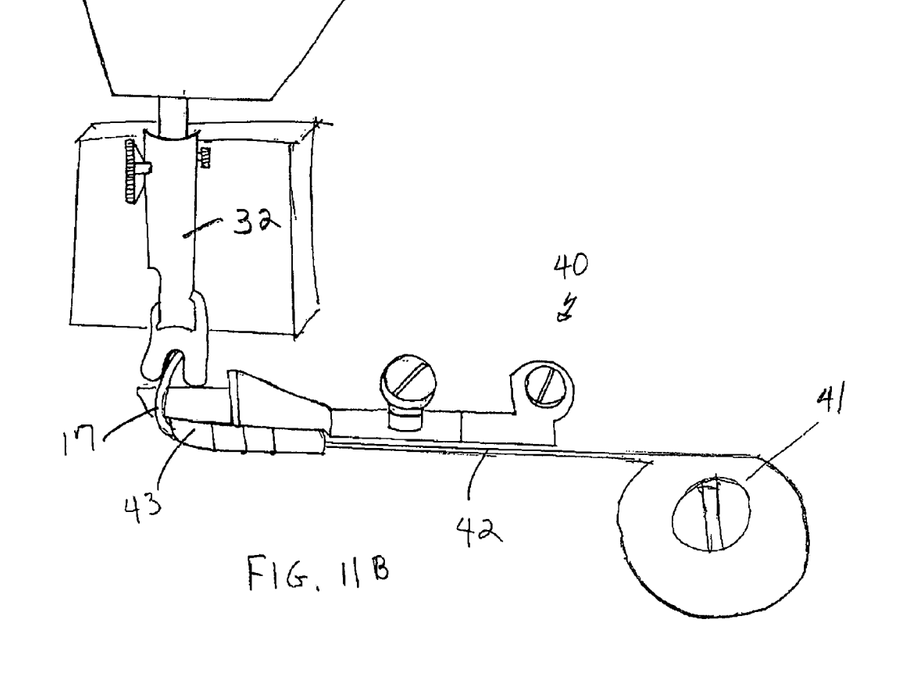
FIG. 11B is a front view of a guide attachment for guiding the adhesive strip into the sewing chamber.

The adhesive strip 17 is guided into the area 13 between the two fabric materials 20, 21 by a seam guide 40 removably attached to the sewing machine front 51. The guide 40 is comprised of an adhesive roll holder 41, a linear guide attachment 42 from the roll holder, terminating in a curved sewing chamber guide 43 guiding the adhesive strip 17 between the two fabric materials 20, 21 forming the seam 10.

Figure 13A:
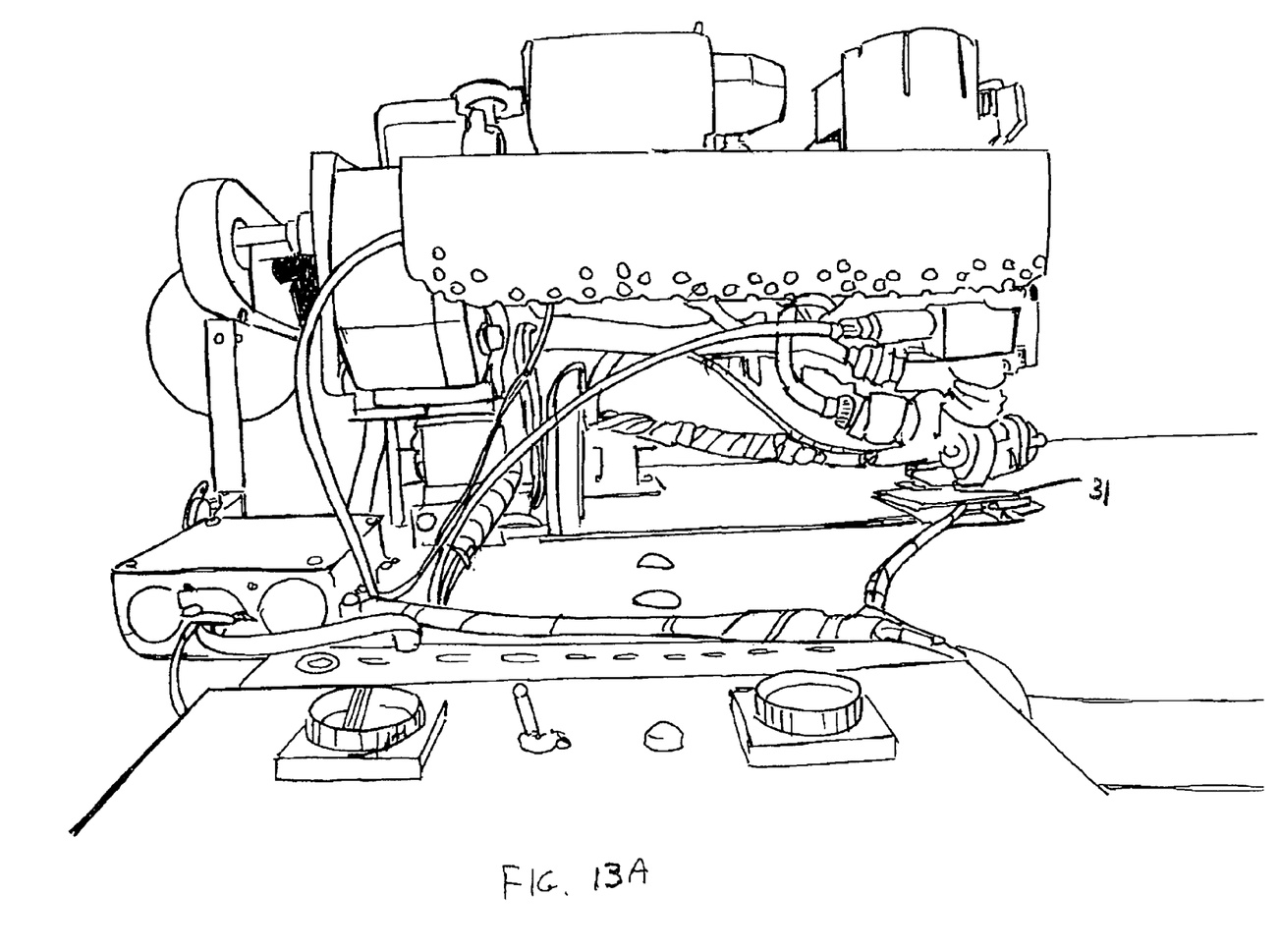
FIG. 13A is a rear view of the invention apparatus.
Figure 13B:
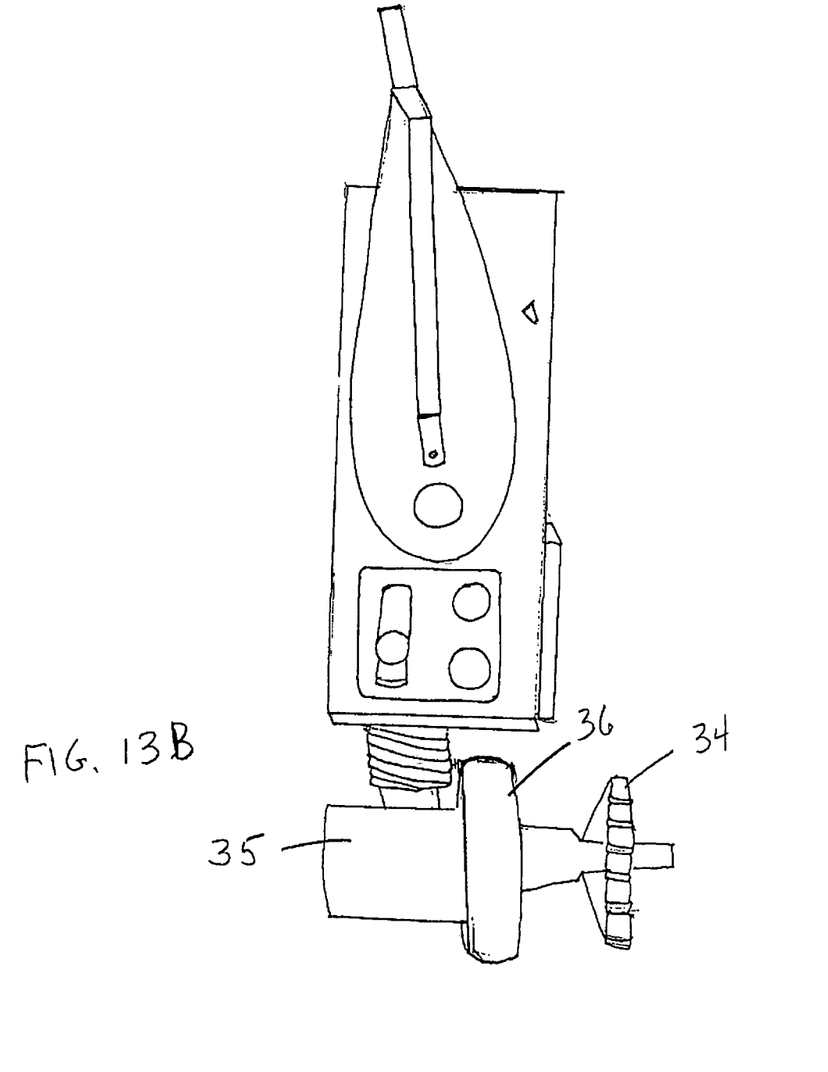
FIG. 13B is a partial rear view of the invention installed on a conventional sewing machine.
Figure 14:
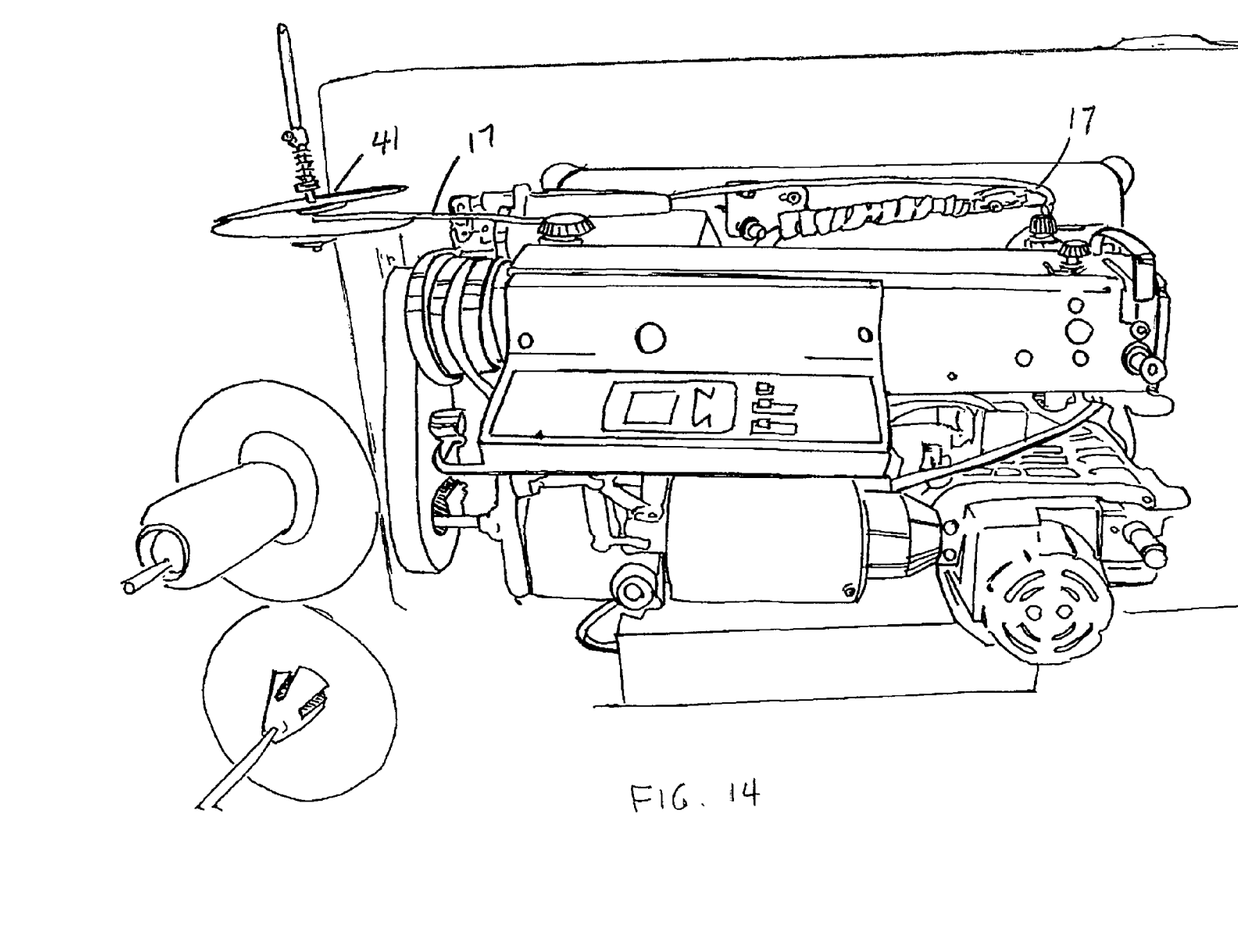
FIG. 14 is a rear top view of the invention apparatus.
Figure 15:
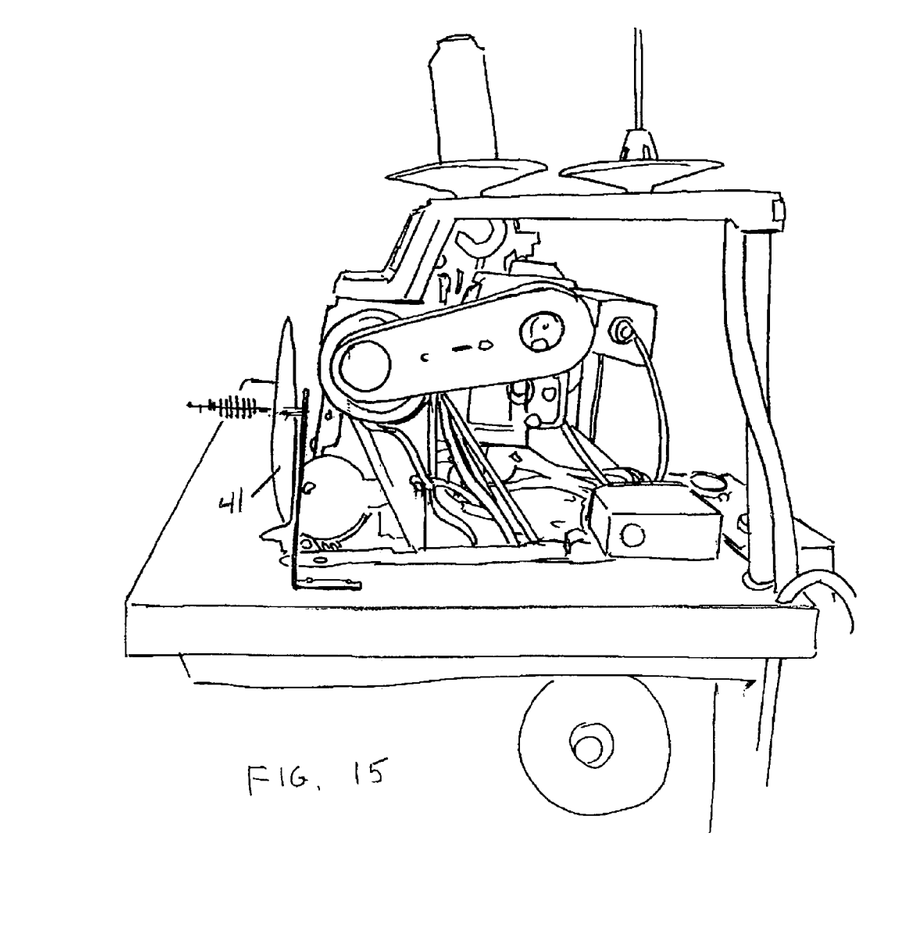
FIG. 15 is a right side view of the invention apparatus.

The invention, is further comprised of a rotating horizontal element 35 electrically driven by the sewing machine 50 or an attachment to the sewing machine. The heater wheel 33 is geared to the rotating element 35 by means of a chain 34. The chain 34 synchronizes the rotation of the heater wheel 33 with the sewing operation. The rotating lament 35 also contains a puller wheel 36 for "pulling" the sewn seam 10 through and from the sewing machine 55. The puller wheel may be used with or without the heater wheel 33.

The heater wheel 33 is attached to a yoke 38. In this embodiment of the invention, an airline cylinder 37 lifts and lowers the yoke 38 thereby lifting and lowering the heater wheel 33.

It is understood that the above-described embodiment is merely illustrative of the application. Other embodiments may be readily devised by those skilled in the art, which will embody the principles of the invention and fall within the spirit and scope thereof.

I claim:

1. A method for forming a water-resistant seam between at least two fabric members, comprising the steps of:
   providing a quantity of thread comprising between about 2% and about 6% by weight of a thermoplastic polymer adhesive selected from the group consisting of polyurethane, nylon, polyester, polyolefin, and vinyl;
   employing a sewing machine to cause a needle to puncture said at least two fabric members at regular intervals and to draw said thread through said punctures, to form a sewn seam;
   applying heat to said sewn seam so as to melt said polymer adhesive from said thread, whereby said polymer adhesive from said thread flows and adheres to the fabric members, filling and sealing said punctures; and
   allowing said polymer adhesive to cool and solidify, whereby said punctures are sealed against ingress of water.

2. The method of claim 1, comprising the additional steps of inserting a strip of thermoplastic polymer adhesive, selected from the group consisting of polyurethane, nylon, polyester, polyolefin, and vinyl, between said at least two fabric members while forming said sewn seam, whereby heat applied to said seam to melt the polymer adhesive from said thread so as to additionally fill said punctures also melts the polymer adhesive of the strip, and allowing said polymer adhesive of the strip to cool and solidify, whereby said seam is sealed against ingress of water.

3. The method of claim 2 wherein the polymer materials applied to said thread and comprising said strip are of the same chemical structure.

4. The method of claim 2 wherein heat is applied to the seam by a heated roller.

5. The method of claim 1, wherein said thread is manufactured by twisting three threads together in a counter clockwise direction and thereafter applying said polymer adhesive, whereby upon thread and needle penetration of the fabric members, said thread additionally expands into the puncture.

6. A method for forming a waterproof seam between at least two fabric members, comprising the steps of:
   providing a quantity of thread comprising between about 2% and about 6% by weight of a polymer adhesive selected from the group consisting of polyurethane, nylon, polyester, polyolefin, and vinyl;
   employing a sewing machine to cause a needle to puncture said at least two fabric members at regular intervals and to draw said thread through said punctures, to form a sewn seam;
   inserting a strip of polymer adhesive selected from the group consisting of polyurethane, nylon, polyester, polyolefin, and vinyl between said at least two fabric members while forming said sewn seam;

applying heat to said seam so as to melt said embedded polymer adhesive from said thread, whereby said polymer adhesive from said thread fills said punctures, and so as to melt said polymer adhesive from said strip, allowing said polymer adhesive from said thread to cool and solidify, whereby said punctures are sealed against ingress of water; and allowing said polymer adhesive of the strip to cool and solidify, whereby said seam between each puncture hole is sealed against ingress of water.

7. The method of claim 6 wherein the thermoplastic materials applied to said thread and comprising said strip are the same.

8. The method of claim 6 wherein heat is applied to the seam by a heated roller.

9. The method of claim 6, wherein said thread is manufactured by twisting three threads together in a counterclockwise direction and by thereafter applying polymer adhesive, whereby said thread expands to fill the puncture when forced through the fabric by the needle.

* * * * *